(12) United States Patent
Toal et al.

(10) Patent No.: US 11,431,481 B2
(45) Date of Patent: Aug. 30, 2022

(54) SYSTEM FOR SECURING MEMORY DUMPS

(71) Applicant: salesforce.com, inc., San Francisco, CA (US)

(72) Inventors: Brian Toal, San Francisco, CA (US); Prasad Peddada, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 127 days.

(21) Appl. No.: 16/677,572

(22) Filed: Nov. 7, 2019

(65) Prior Publication Data
US 2021/0143991 A1   May 13, 2021

(51) Int. Cl.
| | | |
|---|---|---|
| *H04L 29/06* | (2006.01) | |
| *H04L 9/08* | (2006.01) | |
| *H04L 9/40* | (2022.01) | |
| *H04L 9/30* | (2006.01) | |

(52) U.S. Cl.
CPC .......... *H04L 9/0825* (2013.01); *H04L 9/0822* (2013.01); *H04L 9/30* (2013.01); *H04L 63/0435* (2013.01); *H04L 63/061* (2013.01)

(58) Field of Classification Search
CPC . H04L 9/0825; H04L 63/0435; H04L 63/061; H04L 9/30; H04L 9/0822; H04L 63/0823; H04L 2463/062; H04L 63/045; G06F 2221/2107; G06F 11/0778
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Yogesh Paliwal
(74) *Attorney, Agent, or Firm* — Weaver Austin Villeneuve & Sampson LLP

(57) ABSTRACT

Disclosed are some implementations of systems, apparatus, methods and computer program products for securing memory dumps. In response to a trigger condition, a server generates a symmetric key corresponding to an instance of a memory dump. The server encrypts memory contents of the server using the symmetric key. In addition, the server encrypts the symmetric key using a key-encrypting key (kek), which can include a public key Both the encrypted memory contents and the encrypted symmetric key are stored for the instance of the memory dump. Responsive to a request for information pertaining to the instance of the memory dump, the encrypted memory contents and the encrypted symmetric key are retrieved from storage, the encrypted symmetric key is decrypted using a private key, and the symmetric key is used to decrypt the encrypted memory contents.

20 Claims, 8 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B2 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B2 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,443,085 B2 | 5/2013 | Horne et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,775,946 B2 | 7/2014 | Horne et al. |
| 8,904,011 B2 | 12/2014 | Horne et al. |
| 9,037,722 B2 | 5/2015 | Horne et al. |
| 9,781,049 B2 | 10/2017 | Horne et al. |
| 9,892,256 B1 * | 2/2018 | Lango .................... G06F 21/53 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0072310 A1 * | 3/2011 | Lee .............. G06F 11/366 714/38.1 |
| 2011/0218958 A1 | 9/2011 | Warshavsky et al. |
| 2011/0247051 A1 | 10/2011 | Bulumulla et al. |
| 2011/0276674 A1 | 11/2011 | Horne et al. |
| 2011/0276693 A1 | 11/2011 | Horne et al. |
| 2011/0276890 A1 | 11/2011 | Horne et al. |
| 2011/0276892 A1 | 11/2011 | Horne et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0047117 A1 | 2/2014 | Horne et al. |
| 2014/0207942 A1 * | 7/2014 | Kamble ............ H04L 41/18 709/224 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0048709 A1 * | 2/2016 | Butler ............... H01Q 1/38 340/10.51 |
| 2017/0366470 A1 | 12/2017 | Horne et al. |
| 2018/0081824 A1 * | 3/2018 | Bacher ............ H04L 9/3247 |
| 2020/0241951 A1 * | 7/2020 | Koropoff ......... G06F 11/366 |
| 2021/0019442 A1 * | 1/2021 | Patel .............. G06F 21/606 |

\* cited by examiner

SYSTEM FOR SECURING MEMORY DUMPS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with securing memory dumps. More specifically, this patent document discloses techniques for using a computing system to facilitate encrypting memory contents of a server responsive to a trigger condition.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

While accessing these services, an error may be encountered that prevents correct operation of computer software or a system. When an error occurs, a memory dump may cause memory contents of random-access memory (RAM) of a computing device executing the computer software to be stored to a storage medium. A software developer may subsequently access the stored memory contents to diagnose, identify, and resolve the problem that led to the software or system failure.

BRIEF DESCRIPTION OF THE DRAWINGS

The included drawings are for illustrative purposes and serve only to provide examples of possible structures and operations for the disclosed systems, apparatus, methods and computer program products for facilitating authentication of computing system requests across tenants of a multi-tenant database system. These drawings in no way limit any changes in form and detail that may be made by one skilled in the art without departing from the spirit and scope of the disclosed implementations.

DETAILED DESCRIPTION

Figure 1:
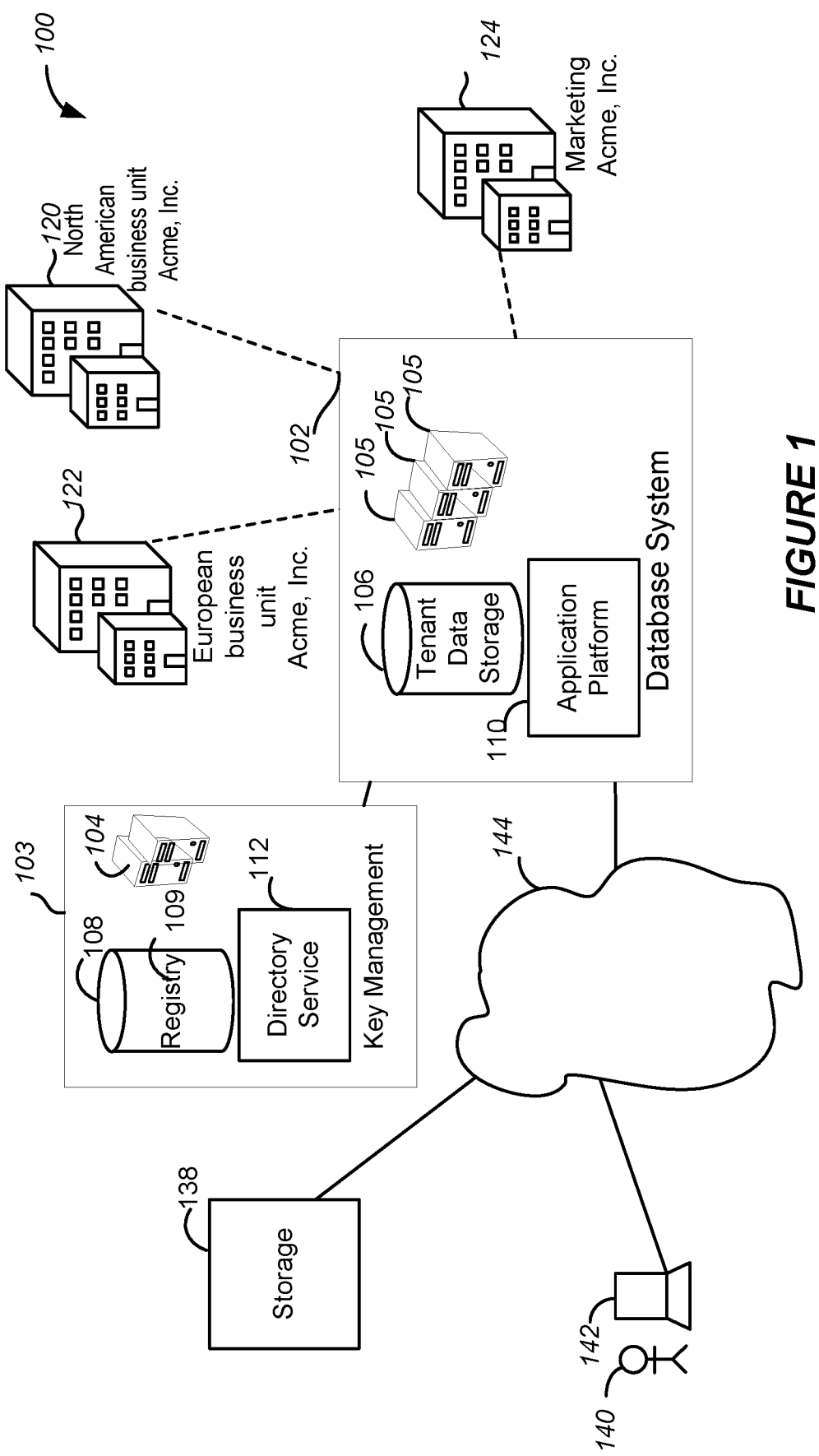
FIG. 1 shows a system diagram of an example of a system 100 in which memory dumps may be secured in a multi-tenant database system, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

A memory dump is a process in which the contents of memory (e.g., Random Access Memory (RAM)) of a computing device executing a software application are stored to a storage medium that is external to the computing device. Often, the memory dump is triggered automatically in response to a system or software error. In some instances, a software developer or other user may choose to trigger a memory dump.

Many services run on a Java Virtual Machine (JVM). In a multi-tenant database system, tenants may share a set of JVMs. As a result, there are many instances in which memory dumps may be triggered.

In some instances, memory allocation on a JVM may spike, causing an out of memory error. An out of memory error may trigger a memory heap dump, which causes a binary representation of a memory heap to be written to disk on the machine running the JVM. The memory heap is typically written to storage using another service via a remote procedure call (RPC). Various tools including Java Development Kit (JDK) and third-party tools are available for use in reading bytes of the memory heap that have been written to storage.

In other instances, a JVM may crash, resulting in the generation of a core file. A core file may be written to disk and accessed in a similar manner to that of a memory heap. In any of the above instances, memory contents of a server are typically written to storage as a result of a memory dump process and eliminated from the main memory of the server.

Software developers and system administrators commonly use memory dumps in a variety of systems to gather diagnostic information that can be used to analyze, identify, and resolve the cause of a system or computer program error. Therefore, memory dumps can be a valuable tool that can be used in a variety of circumstances to troubleshoot problems where the cause is not immediately evident.

In one common scenario, a user within an organization accesses a service offered by the organization. For example, the user may be conducting testing of a software computer program that provides the service. While accessing the service, an error occurs that prevents further operation of the service. When a memory dump is triggered, memory contents of a computing device executing the software program are stored to a storage medium.

The memory contents that are stored as a result of a memory dump often include sensitive information such as data that has been retrieved from organizational databases. For example, the memory contents may include customer account information, session identifiers (IDs), Internet Protocol (IP) addresses, and/or encryption keys. Unfortunately, the memory contents are typically stored in an unencrypted format and available tools do not offer the capability to encrypt the offloaded memory contents.

Where the computing device executing the software computer program and the storage medium to which the memory contents are stored are physically located within the organization, data may be compromised as a result of unauthorized access to the stored memory contents by employees of the organization. Moreover, in the event that the software computer program is executed in a public cloud, the data may be compromised as a result of access by individuals who are not employed by the organization. Therefore, current methods of performing memory dumps are sub-optimal.

In the following description, the computing device that performs a memory dump may be referred to as a server. Therefore, the terms "computing device" and "server" may be used interchangeably.

Various implementations described or referenced herein are directed to different systems, methods, apparatus, and computer program products for securing memory dumps. In some implementations, a server executing a computer program detects an instance of a memory dump trigger condition. The server generates a symmetric key that corresponds to the instance of the memory dump trigger condition. The server encrypts memory contents residing in memory (e.g., random-access memory (RAM)) of the server using the symmetric key. In addition, the server encrypts the symmetric key using a public key corresponding to a digital certificate. The server facilitates storing of the encrypted memory contents and the encrypted symmetric key to at least one storage medium external to the server such that the encrypted memory contents are stored in the storage medium in association with the encrypted symmetric key.

In some implementations, a user may request access to the stored memory contents corresponding to the instance of the memory dump trigger condition. The system may decrypt the encrypted symmetric key using a private key corresponding to the digital certificate. The encrypted memory contents may then be decrypted using the symmetric key and provided in response to the user request.

In some implementations, the memory dump trigger condition is system-generated. For example, the memory dump trigger condition may include an error that occurs during execution of a software computer program by the server. In some implementations, the memory dump trigger condition is user-generated. For example, a user may initiate a memory dump by entering or selecting a user-initiated command via an Input/Output (I/O) device.

In some implementations, a database system is configured to maintain data that is accessed by server(s) and stored in server memory (e.g., RAM). In some implementations, the database system is a multi-tenant database system. A multi-tenant database system typically supports tenants of multiple organizations or companies. The tenants of the database system may include various organizations of users who interact with cloud-based applications running on the database system or on platform(s) associated with the database system.

In some implementations, an organization is associated with one or more tenants of one or more multi-tenant database systems. In some implementations, a tenant of the multi-tenant database system may not access data from another tenant of the multi-tenant database system. In some implementations, the multi-tenant database systems may be configured to support the sharing of data between tenants of an organization.

In database oriented computing systems and environments in which the present techniques can be implemented, the actions of users when interacting with cloud-based applications may cause data to be accessed from the database system, cause data to be generated and stored in the database system, or cause data to be modified in the database system. Non-limiting examples of system events corresponding to user activity include, by way of illustration, a login or a logout, a uniform resource identifier (URI) which may represent a page click and view, an application programming interface (API) call, a record access, a page request, or other type of system request.

In some implementations, a server stores data and/or metadata that has been obtained from the database system, during execution of a software computer program, in its main memory (e.g., RAM). Upon detecting a memory dump trigger condition, the server implements an encryption mechanism that secures contents of its main memory during a memory dump process. The secured memory contents are written in encrypted form to storage as a result of the memory dump.

By way of illustration, Acme Corporation purchases three tenants: an instance of Marketing, an instance of Commerce (e.g., an online store) for their North American business unit, and an instance of Commerce for their European business unit. An employee of Acme Corporation, Randall, working as a software developer in the North American business unit is responsible for troubleshooting system and software problems within the business unit. Randall is testing an online service offered to customers of the North American business unit. During the testing, the service ceases to function. In response, a memory dump is triggered and the contents of RAM of a server providing the online service are output for storage.

Typically, the contents of the RAM would be stored in an unencrypted format. However, the North American business unit is transitioning to a cloud computing system that would store the results of a memory dump in the cloud. Therefore, storing the contents of the RAM in an unencrypted format would increase the risk that confidential data could be compromised.

Through the application of a memory dump encryption mechanism, the contents of the RAM of the server are encrypted and stored to storage that is external to the server. Later, when Randall chooses to debug the cause of the service error, he submits a request to view the memory contents that were written to storage as a result of the memory dump. In response, the encrypted contents are retrieved from storage and decrypted for presentation via Randall's client device.

FIG. 1 shows a system diagram of an example of a system 100 in which memory dumps may be secured in a multi-tenant database system, in accordance with some implementations. Various tenants of system 100 are supported by one or more database systems 102. Each database system 102 may support a group of tenants. For example, database system 102 may include a multi-tenant database system, as shown in this example.

Tenant database system 102 includes any number of computing devices such as servers 105. In some implementations, to scale a data center design, a data center has an architecture that includes racks or pods of servers. For example a pod may one or more rows of servers 105. Each of servers 105 is configurable to secure memory dumps, as described herein.

Servers 105 are in communication with one or more storage mediums configured to store and maintain tenant data generated by or otherwise maintained by tenants of tenant database system 102. In this example, the storage mediums include tenant data storage 106. For example, tenant data storage 106 can store data for each tenant of one or more multi-tenant database(s). In addition, tenant data storage 106 may store metadata or other information received and/or generated by the tenants.

An application platform 110 of the tenant database system 102 may be a framework that allows applications of the tenant database system 102 to run. For example, the application platform may include hardware and/or software, e.g., the operating system. In some implementations, the application platform 110 supports the creation, managing and executing of one or more applications. In addition, the application platform may be configured to perform some of the techniques described herein.

In some implementations, tenant database system 102 is configured to store privilege information identifying or specifying access rights and restrictions of users according to various attributes such as a specified user ID, type of user, role of the user, a community to which the user belongs, and/or a particular organization on behalf of which a community is maintained. Each of the communities may be operated on behalf of an organization. Each organization may have associated therewith one or more tenants, which may each be associated with one or more communities.

In FIG. 1, tenants 120, 122, 124 are operated on behalf of Acme Corporation. In FIG. 1, tenant 120 is operated on behalf of Acme Corporation's North American core business unit, tenant 122 is operated on behalf of Acme Corporation's European core business unit, and tenant 124 is operated on behalf of Acme Corporation's Marketing operations.

A user 140 employed by an organization may access a login page at a uniform resource locator (URL). Once logged in, the user may use an application within a tenant of the organization such as tenant 124, using a suitable client computing device 142 such as a personal computer, laptop, tablet or smartphone via network 144. While using this application, the application may request access to data of database system 102. During operation of the application, information including the data may be temporarily stored in RAM of a server 105 executing the application.

In some implementations, server 105 detects an instance of a memory dump trigger condition, generates a key corresponding to the instance of the memory dump trigger condition, and encrypts contents of memory of server 105 using the key to secure the memory contents that are written to storage. The key may include a symmetric key, which may also be referred to as a secret key. In various implementations, server 105 generates a new key for each memory dump, providing further security for memory dumps performed by servers 105 of database system 102.

To secure the symmetric key that has been used to encrypt the memory contents, server 105 encrypts the key using a second key. The second key may include a public key from an asymmetric pair. The public key may also be referred to as a key-encrypting key (kek) or transport key. In some implementations, server 105 obtains the public key from key management service 103 that stores security access keys for a plurality of tenants.

For example, server 105 may identify a digital certificate from a request (e.g., HTTP request) received from client computing device 142. Server 105 may obtain the public key corresponding to the digital certificate from key management service 103 and apply the public key corresponding to the digital certificate to encrypt the symmetric key.

In some implementations, server 105 stores the encrypted memory contents and encrypted symmetric key to storage medium(s) 138. For example, server 105 may transmit the encrypted memory contents and encrypted symmetric key via network 144 to storage medium 138. Storage medium 138 may include physical or virtual memory.

In FIG. 1, key management service 103 includes any number of computing devices such as servers 104. Servers 104 are in communication with one or more storage mediums 108 of key management service 103. In this example, storage mediums 108 include a registry 109 that stores registry information including public keys associated with individual tenants and/or trust groups. Registry information may be used as described herein to encrypt the server-generated symmetric key, decrypt the encrypted symmetric key, and facilitate authentication of requests from tenants of database system 102 or client devices associated therewith. Such requests can include, for example, requests for an unwrapped key used for encrypting memory contents.

In some implementations, registry 109 may indicate or include, for each tenant of the tenant database system 102, a public key. In some implementations, the registry 109 does not store private keys for the tenants to ensure that the private keys remain secure. In other implementations, the registry 200 may further store a private key for each of the tenants 109. In some implementations, registry 109 stores public and private keys corresponding to digital certificates.

Key management service 103 also includes a directory service 112 configured to access and/or communicate with the registry 109. In some implementations, servers 105 may communicate with directory service 112, but cannot directly access registry 109. In some implementations, directory service 112 may also be configured to communicate with tenants of system 100. Storage mediums 108 may further store computer-readable instructions configured to provide key management service.

In some implementations, directory service 112 may be configured to provide access to public and/or private keys in response to requests from system components such as servers 105. In some implementations, directory service 112 may provide access to public keys to tenants in response to requests from tenants of database system 102. In some implementations, directory service 112 may provide access to private keys to tenants with which the corresponding digital certificates are associated.

In some implementations, key management service 103 may be configured to perform encryption of information provided to it using a public key it retrieves from registry 109 and/or perform decryption of information provided to it using a private key it retrieves from registry 109. For example, key management service 103 may perform authentication of an entity in response to a request from a system component. As another example, key management service 103 may perform encryption and/or decryption, as described herein.

Database system(s) 102 may be independent from or integral with the key Management system 103. Each database system 102 may communicate with the key Management System 103, as described herein.

In some implementations, directory service 112 is configured to respond to tenant requests for information from registry 109, as described herein. In some implementations, directory service 112 is implemented by a tenant of the tenant database system 102.

In accordance with various implementations, key management service 103 is configured to facilitate authentication. In some implementations, authentication includes verifying the identity of a tenant from which a request is sent to database system 102 or key management service 103. In some implementations, key Management service 103 is further configured to facilitate authorization of a requesting tenant or user to access the requested data (or application).

A user may submit a request to database system 102 to access memory contents corresponding to an instance of a memory dump. In response to the request, the corresponding encrypted memory contents may be decrypted and provided to the user, as will be described in further detail below. The decryption process may be accomplished via the server 105 that performed the memory dump or another server 105.

Decryption of the encrypted memory contents may be facilitated using a private key corresponding to the public key (e.g., public-private key pair). More particularly, the encrypted symmetric key may be decrypted using the private key and the resulting symmetric key may subsequently be used to decrypt the encrypted memory contents. The private key may be retrieved from key management service 103, as described below.

In some implementations, in order to unwrap the symmetric key, the user successfully authenticates into a key unwrapping service. For example, the user may be challenged to authenticate with the service using some form of two factor authentication. Once successfully authenticated, the user may provide the wrapped symmetric key to the service. The service may return the unwrapped key as long as the user has permissions to have the unwrapped key.

Figure 2:
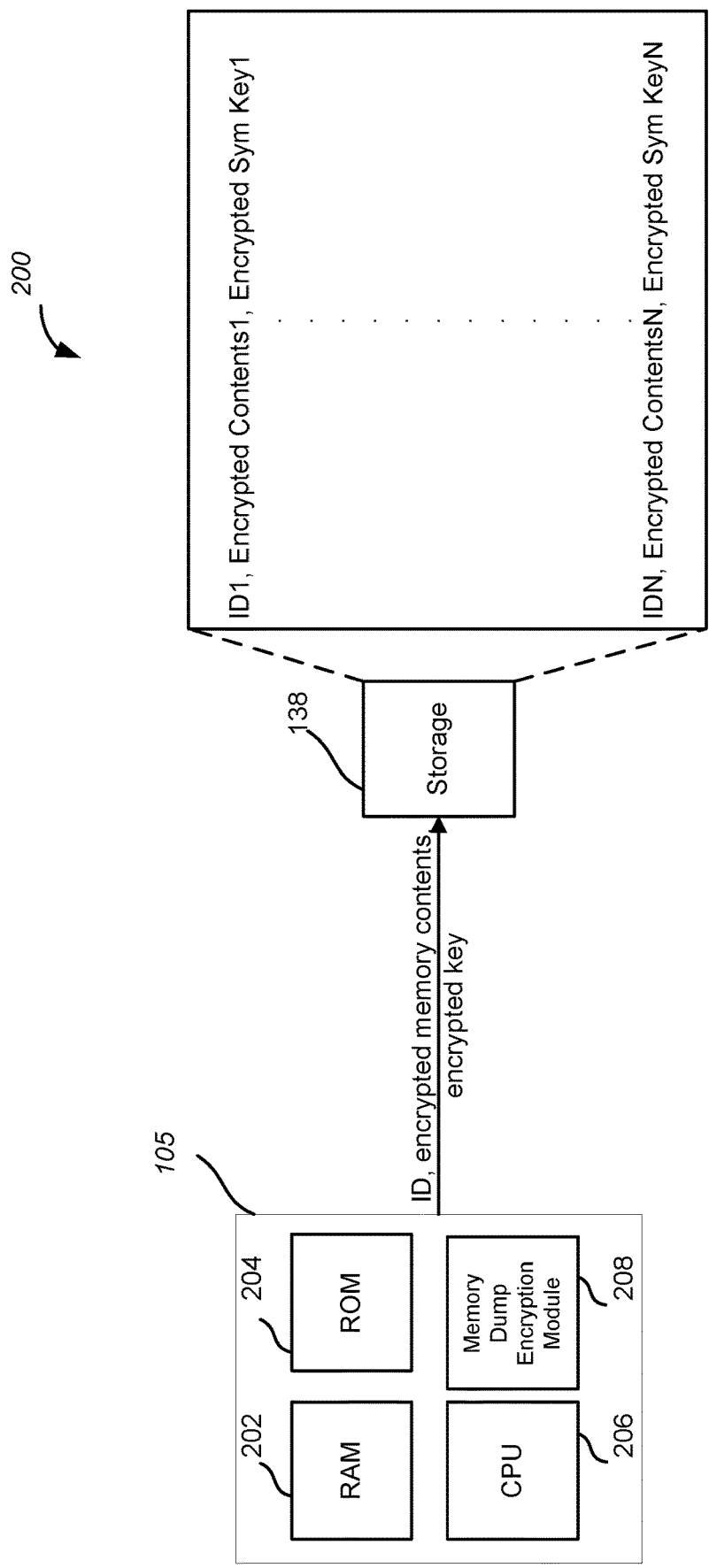
FIG. 2 shows a diagram of a system 200 in which a server secures a memory dump, in accordance with various implementations.

FIG. 2 shows a diagram of a system 200 in which a server secures a memory dump, in accordance with various implementations. As shown in this example, server 105 may include RAM 202, Read-Only Memory (ROM) 204, and at least one processor, shown as Central Processing Unit (CPU) 206. In addition, memory dump encryption module 208 may be installed on server 105. CPU 206 of server 105 may be configured to execute memory dump encryption module 208 in response to detection of a memory dump trigger condition.

Server 105 may implement any operating system or hardware. In some implementations, server 105 runs a JVM that executes Java applications.

Memory dump encryption module 208 may generate a symmetric key for a particular memory dump instance, encrypt memory contents of RAM 202 using the server-generated symmetric key, and encrypt the symmetric key with a public key (kek). The kek may be obtained from key management service 103, as described in further detail below. Memory contents may include a plurality of objects, which may be represented in one or more data structures or memory dump files. For example, the objects may be represented by a graph or tree. Encrypted memory contents may include encrypted bytes of data of the memory dump files.

Memory dump encryption module 208 may transmit an identifier (ID) associated with the instance of the memory dump, the encrypted memory contents, and the encrypted symmetric key to storage medium 138. As shown in this example, storage medium 138 may store memory dump information for each one of a plurality of memory dump instances. For each memory dump instance, a corresponding set of information including the ID, encrypted memory contents, and encrypted symmetric key is stored in storage medium 138.

Decryption of encrypted memory contents may be facilitated by a decryption module. Such a decryption module may be installed on server 105, as well as other servers 105. Upon receipt of a user request for the memory contents associated with the corresponding memory dump, the encrypted memory contents may be decrypted so that the memory contents that were previously stored may be provided, as will be described in further detail below. Since encryption and decryption may be performed by any server 105, a user need not submit a request for memory contents associated with a memory dump instance via the same server 105 via which the memory contents were encrypted. Any server 105 may service a request for memory contents associated with a particular memory dump.

Each server 105 within database system 102 may be configured to perform techniques described herein. As a result, memory dumps may be secured throughout database system 102. Since each server 105 within database system 102 may secure memory dumps, techniques described herein may be scaled to a system or data center of any size containing any number of servers.

Figure 3:
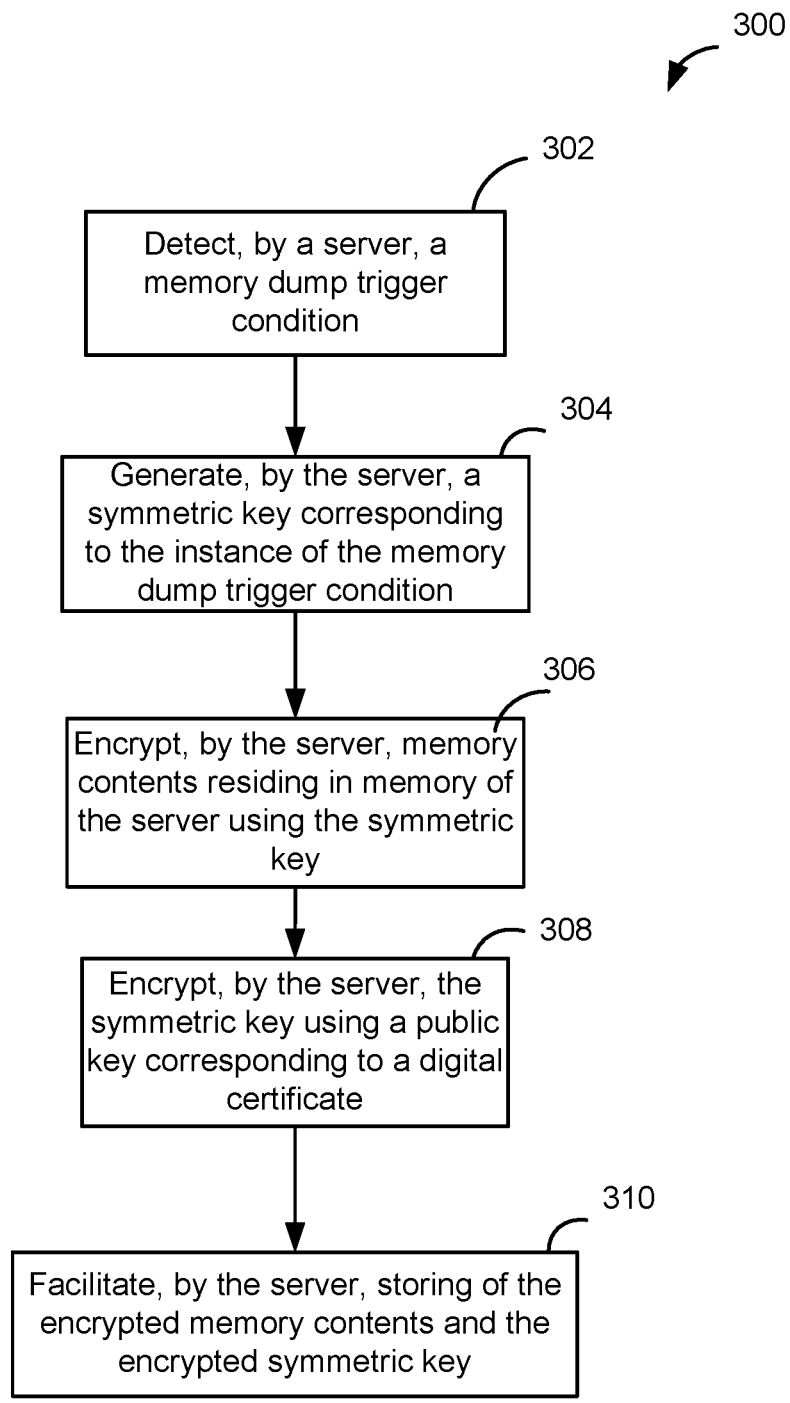
FIG. 3 shows a flow diagram of an example of a method 300 for encrypting memory contents stored as a result of a memory dump, in accordance with various implementations.

FIG. 3 shows a flow diagram of an example of a method 300 for encrypting memory contents stored as a result of a memory dump, in accordance with various implementations. During execution of a computer program, a server may detect an instance of a memory dump trigger condition at 302. A memory dump trigger condition may include a user command, which may be submitted, for example, via a command line utility or GUI. In addition, a memory dump trigger condition may include an error such as an out of memory error or other type of error detected by the server during execution of the computer program.

As described herein, the server may generate an encryption key for each memory dump instance. Thus, at 304, the server generates a symmetric key corresponding to the instance of the memory dump trigger condition. In some implementations, the symmetric key may include an Advanced Encryption Standard (AES) key. For example, the AES key may be a 256-bit AES key. Since the server generates a new symmetric key for each instance of a memory dump, this increases the security with which memory dumps are performed.

The server encrypts memory contents residing in memory of the server using the symmetric key at 306. For example, a memory heap of a server running a computer program may be encrypted. Specifically, as the memory contents are written out to storage, the memory contents may be encrypted using the generated symmetric key. In some implementations, bytes of data stored in the memory of the server are streamed through an encryption engine and ciphertext is written to storage. For example, the encryption engine may perform AES-256 encryption using the 256-bit AES key. As described herein, the memory may include RAM.

At 308, the server may encrypt the symmetric key using a public key corresponding to a digital certificate. For example, the digital certificate may be registered with a JVM on startup. The digital certificate may link a web server for a domain to an individual or organization that owns the domain. For example, the digital certificate may be associated with an organization or a tenant of the organization. The encrypted symmetric key may be persisted at the server.

In some implementations, the server obtains the public key corresponding to the digital certificate from key management service 103. For example, the server may provide the certificate to key management service 103. Key management service 103 may ensure that the certificate is valid prior to providing the public key to server 105. In some implementations, key management service 103 may validate that the public key is intended for encryption and storage of server memory contents (e.g., heap storage).

As described herein, the public key may also be referred to as a kek or transport key, since it is used to encrypt or "wrap" the symmetric key. In some implementations, assymetric encryption such as Rivest-Shamir-Adleman (RSA) encryption is used to encrypt the symmetric key using the public key as the RSA public key. For example, an RSA function may be called with a mode parameter indicating that the mode is a wrap mode (i.e., encryption mode) and a key parameter including the RSA public key.

In some implementations, an encryption service called via the RSA function may validate the RSA public key to ensure that it came from a trusted source. For example, the encryption service may wish to confirm that the public key has been issued by a valid Certificate Authority (CA). In addition, the encryption service may validate that the public key is intended for encryption and storage of server memory contents. The encryption service may communicate with the key management service 103 to facilitate the validation of the public key.

At 310, the server may facilitate storing of the encrypted symmetric key and encrypted memory contents to at least one storage medium such that the encrypted memory contents are stored in the storage medium in association with the encrypted symmetric key for the memory dump instance. This may be accomplished by transmitting the encrypted memory contents and the encrypted symmetric key in one or more files for storage in the storage medium. As described herein, the storage medium may be implemented in the form of physical or virtual memory such as cloud storage. In some implementations, the encrypted symmetric key is transmitted to the storage medium together with the encrypted memory contents. For example, both the encrypted 256-bit AES key and AES encrypted memory heap may be packaged in one or more files and sent to cloud storage. In other implementations, the encrypted symmetric key is transmitted independently from the encrypted memory contents.

Figure 4:
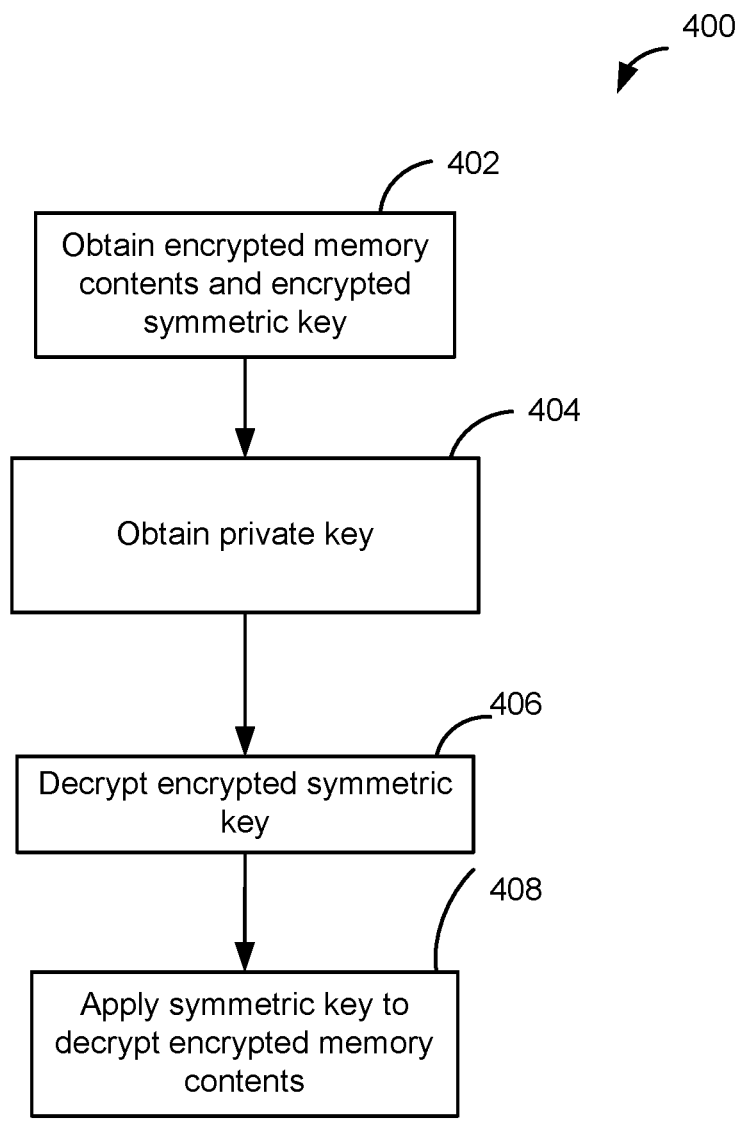
FIG. 4 shows a flow diagram of an example of a method 400 for providing access to encrypted memory contents stored as a result of a memory dump, in accordance with various implementations.

FIG. 4 shows a flow diagram of an example of a method 400 for providing access to encrypted memory contents stored as a result of a memory dump, in accordance with various implementations. A user may wish to analyze the cause of the computer program or system error by viewing the memory contents that were previously encrypted and stored in association with an instance of a memory dump. Thus, the user may submit a request via database system 102 or another system that is configured to communicate with key management service 103. For example, the user may request access to a particular memory dump instance from a menu or other user interface. As described above, the memory dump instance may be associated with an ID that is unique to the memory dump instance.

The user may be authenticated through some form of authentication such as two-factor authentication. In addition, database system 102 or another service may confirm that the user is authorized to access information pertaining to the memory dump. In this manner, the system may verify that the user is authorized to access the stored information associated with the memory dump.

The system may obtain the encrypted memory contents and the encrypted symmetric key at 402 from storage. For example, the system may retrieve one or more files including the encrypted memory contents and the encrypted symmetric key from cloud storage. In some implementations, the system connects to a service storing the encrypted memory contents and the encrypted symmetric to retrieve the encrypted memory contents and the encrypted symmetric key.

To obtain the symmetric key that was used to encrypt the memory contents, a private key corresponding to the public key used to encrypt the symmetric key is obtained at 404. For example, the system may communicate with key management service 103 to retrieve the private key corresponding to the digital certificate, which may be identified from the request submitted by the user.

During this process, the system may validate the digital certificate identified in the request to ensure that the request is from a trusted source. For example, the system may communicate with key management service 103 to validate the digital certificate. In some implementations, key management service 103 verifies that the communication from the system to key management service 103 was issued by a known tenant, which may include authenticating the communication using a public key of the corresponding tenant. Thus, key management service 103 may validate the digital certificate prior to providing the private key or otherwise applying the private key as described in further detail below.

After the user has been successfully authenticated and any further validation is performed, the system may decrypt or "unwrap" the encrypted symmetric key using the private key to obtain the symmetric key at 406. For example, an RSA function may be called with a mode parameter indicating that the mode is an unwrap mode (i.e., decryption mode) and a key parameter including the private key. The system may then apply the symmetric key to decrypt the previously encrypted memory contents at 408.

Results of the decryption may be presented to the user for debugging. Since none of the keys are exposed to client devices, memory dumps may be secured and used for debugging without compromising security. In this manner, information such as a memory heap that is encrypted and stored as a result of a memory dump process may be accessed and viewed by a trusted engineer who can examine the contents of the memory heap.

In some implementations, key management service 103 manages security access keys and access thereto. Key management service 103 may maintain security access keys in a registry, as described in further detail below with reference to FIG. 5.

Figure 5:
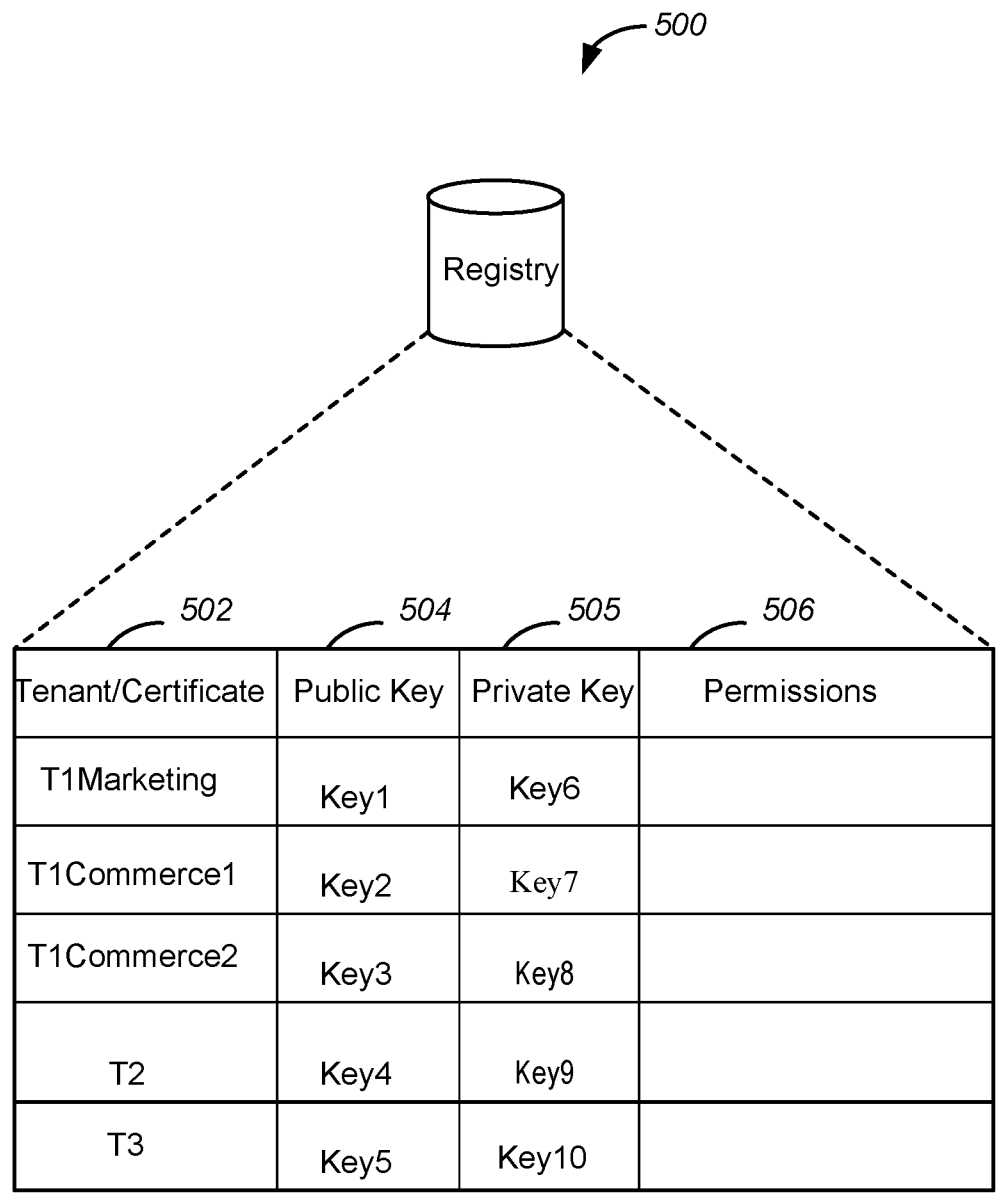
FIG. 5 shows an example of a registry 500 that may be implemented by a key management service, in accordance with various implementations.

FIG. 5 shows an example of a registry 500 that may be implemented by a key management service, in accordance with various implementations. Registry 500 may store registry information including metadata corresponding to a plurality of tenants of database system 102. For example, the registry 200 may include one or more database tables that store metadata in fields of the database tables.

In accordance with various implementations, registry 500 stores registry information including security access keys for all tenants of an organization. In some implementations, registry 500 stores security access keys for tenants of multiple organizations.

Registry information associated with a tenant may include, but is not limited to, a tenant identifier or digital certificate 502, a public key 504 of the corresponding tenant, and/or a private key 505 of the corresponding tenant. In addition, registry information for a given tenant may indicate a set of permissions 506. The set of permissions 206 may indicate a set of trusted entities (e.g., tenants and/or users thereof) that are trusted by the corresponding tenant 202. For example, the set of permissions 506 may indicate which tenants or users thereof are authorized to access data such as that associated with memory dumps.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level networking systems in conjunction with the disclosed techniques.

Figure 6A:
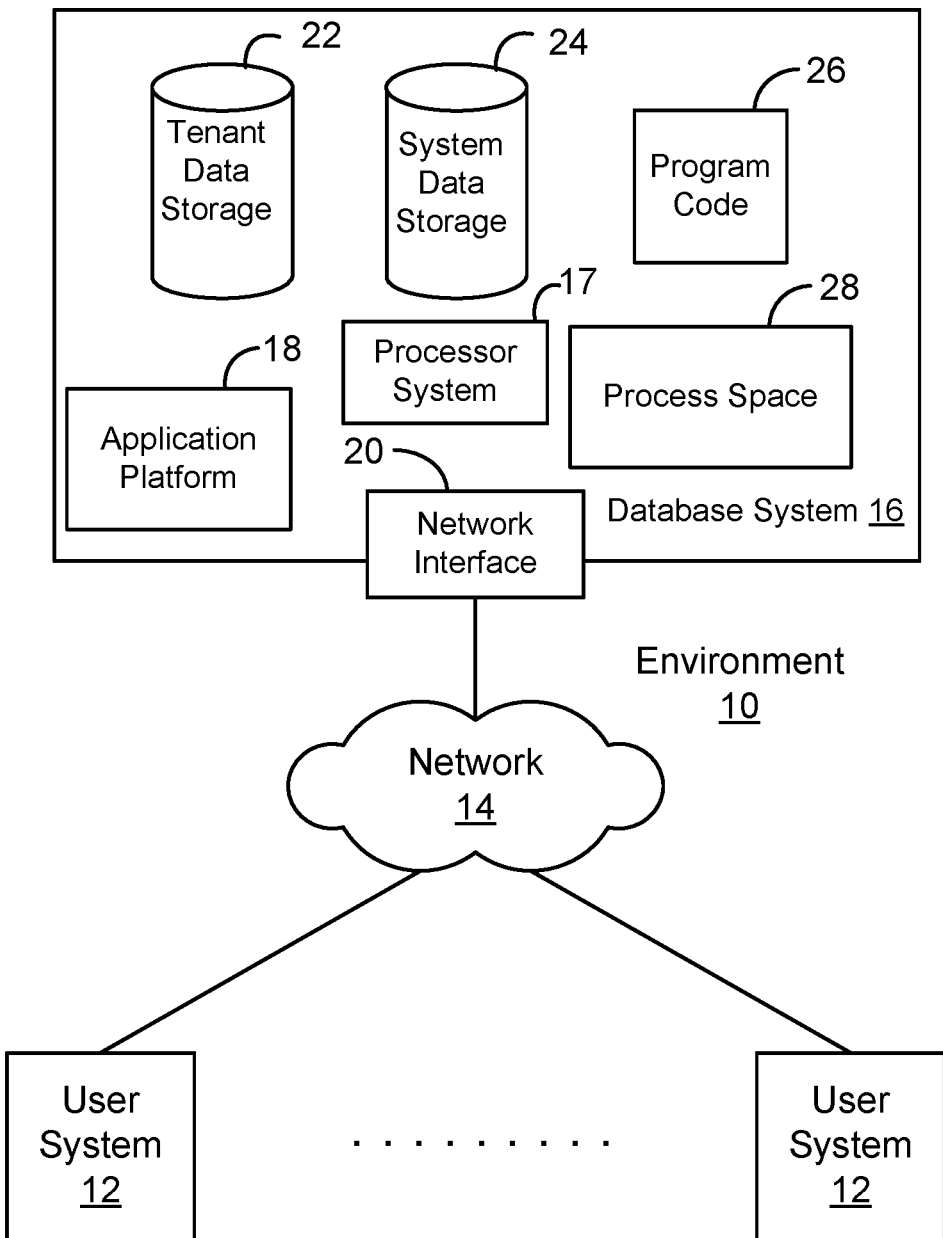
FIG. 6A shows a block diagram of an example of an environment 10 in which an on-demand database service can be used in accordance with some implementations.

FIG. 6A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
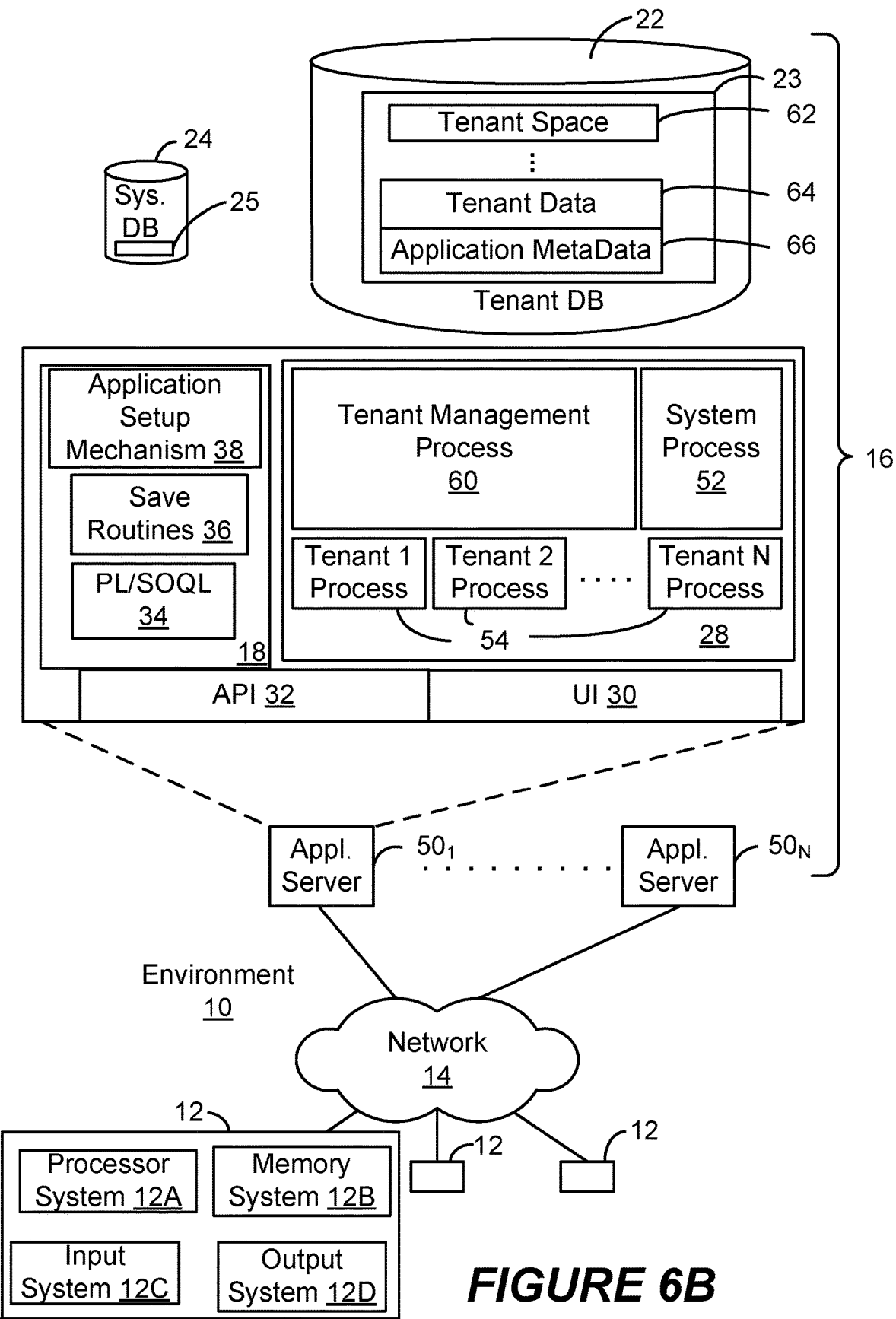
FIG. 6B shows a block diagram of an example of some implementations of elements of FIG. 6A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
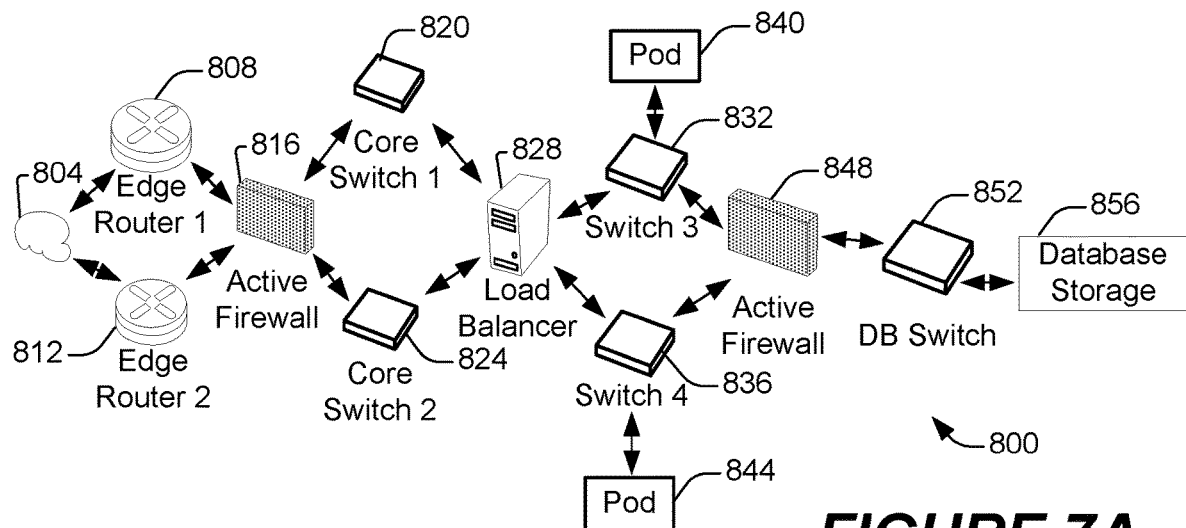
FIG. 7A shows a system diagram of an example of architectural components of an on-demand database service environment 900, in accordance with some implementations.

FIG. 7A shows a system diagram illustrating an example of architectural components of an on-demand database service environment 800 according to some implementations. A client machine located in the cloud 804, generally referring to one or more networks in combination, as described herein, may communicate with the on-demand database service environment via one or more edge routers 808 and 812. A client machine can be any of the examples of user systems 12 described above. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand database service environment may communicate with a database storage 856 via a database firewall 848 and a database switch 852.

Figure 7B:
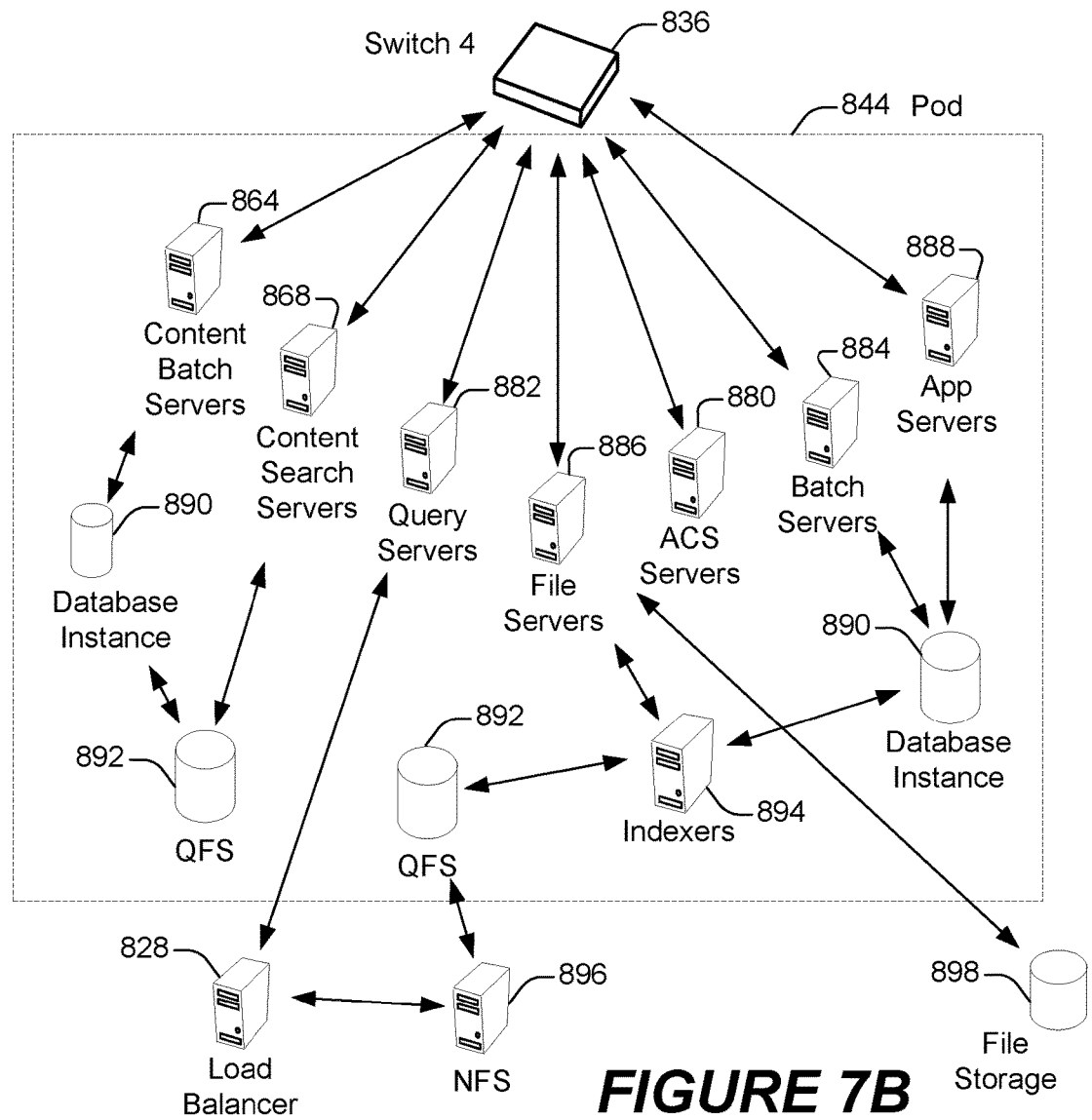
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 800 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand database service environment to access services provided by the on-demand database service environment. For example, client machines may access the on-demand database service environment to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The BGP is the core routing protocol of the Internet. The edge routers 808 and 812 may maintain a table of IP networks or 'prefixes', which designate network reachability among autonomous systems on the Internet.

In one or more implementations, the firewall 816 may protect the inner components of the on-demand database service environment 800 from Internet traffic. The firewall 816 may block, permit, or deny access to the inner components of the on-demand database service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 may be configured as network bridges that quickly route data between different components within the on-demand database service environment. In some implementations, the use of two or more core switches 820 and 824 may provide redundancy and/or reduced latency.

In some implementations, the pods 840 and 844 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage 856 may be conducted via the database switch 852. The multi-tenant database storage 856 may include more than one hardware and/or software components for handling database queries. Accordingly, the database switch 852 may direct database queries transmitted by other components of the on-demand database service environment (e.g., the pods 840 and 844) to the correct components within the database storage 856.

In some implementations, the database storage 856 is an on-demand database system shared by many different organizations. The on-demand database system may employ a multi-tenant approach, a virtualized approach, or any other type of database approach. An on-demand database system is discussed in greater detail with reference to FIGS. 7A and 7B.

FIG. 7B shows a system diagram further illustrating an example of architectural components of an on-demand database service environment according to some implementations. The pod 844 may be used to render services to a user of the on-demand database service environment 800. In some implementations, each pod may include a variety of servers and/or other systems. The pod 844 includes one or more content batch servers 864, content search servers 868, query servers 882, file servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the app servers 888 may include a hardware and/or software framework dedicated to the execution of procedures (e.g., programs, routines, scripts) for supporting the construction of applications provided by the on-demand database service environment 800 via the pod 844. In some implementations, the hardware and/or software framework of an app server 888 is configured to execute operations of the services described herein, including performance of the blocks of methods described with reference to FIGS. 1-4. In alternative implementations, two or more app servers 888 may be included and cooperate to perform such methods, or one or more other servers described herein can be configured to perform the disclosed methods.

The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand database service environment.

The file servers 886 may manage requests for information stored in the File storage 898. The File storage 898 may store information such as documents, images, and basic large objects (BLOBs). By managing requests for information using the file servers 886, the image footprint on the database may be reduced.

The query servers 882 may be used to retrieve information from one or more file systems. For example, the query system 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may call upon various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 828, which may distribute resource requests over various resources available in the on-demand database service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without using an additional database call.

In some implementations, database information may be transmitted to the indexer 894. Indexer 894 may provide an index of information available in the database 890 and/or QFS 892. The index information may be provided to file servers 886 and/or the QFS 892.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
detecting, by the server system, an instance of a memory dump trigger condition;
generating, by the server system, a symmetric key corresponding to the instance of the memory dump trigger condition;
encrypting, by the server system, memory contents residing in memory of the server system using the symmetric key;
encrypting, by the server system, the symmetric key using a public key corresponding to a digital certificate;
determining, by the server system, that the encrypted memory contents are to be stored in association with the encrypted symmetric key in at least one cloud storage medium external to the server system; and
transmitting, by the server system, the encrypted memory contents and the encrypted symmetric key to the at least one cloud storage medium for cloud storage of the encrypted memory contents in association with the encrypted symmetric key in the at least one cloud storage medium, the encrypted memory contents being accessible from the at least one cloud storage medium using the encrypted symmetric key.

2. The system as recited in claim 1, the encrypted memory contents and encrypted symmetric key being stored in association with a memory dump instance identifier identifying a particular memory dump instance, the database system further configurable to cause:
processing a request to access the memory contents for the particular memory dump instance;
retrieving the encrypted memory contents and the encrypted symmetric key from the at least one cloud storage medium;
decrypting the encrypted symmetric key using a private key corresponding to the digital certificate; and
facilitating decryption of the encrypted memory contents using the symmetric key.

3. The system as recited in claim 1, the memory being a main memory of the server system.

4. The system as recited in claim 1, the database system further configurable to cause:
obtaining the public key corresponding to the digital certificate from a key management service.

5. The system as recited in claim 1, the symmetric key comprising an Advanced Encryption Standard (AES) key.

6. The system as recited in claim 1, the public key comprising a Rivest-Shamir-Adleman (RSA) key, and wherein encrypting the symmetric key is performed using RSA encryption.

7. The system as recited in claim 1, the memory contents comprising a memory heap.

8. A method, comprising:
detecting, by a server system, an instance of a memory dump trigger condition;
generating, by the server system, a symmetric key corresponding to the instance of the memory dump trigger condition;
encrypting, by the server system, memory contents residing in memory of the server system using the symmetric key;
encrypting, by the server system, the symmetric key using a public key corresponding to a digital certificate;
determining, by the server system, that the encrypted memory contents are to be stored in association with the encrypted symmetric key in at least one cloud storage medium external to the server system; and
transmitting, by the server system, the encrypted memory contents and the encrypted symmetric key to the at least one cloud storage medium for cloud storage of the encrypted memory contents in association with the encrypted symmetric key in the at least one cloud storage medium, the encrypted memory contents being accessible from the at least one cloud storage medium using the encrypted symmetric key.

9. The method as recited in claim 8, the encrypted memory contents and encrypted symmetric key being stored in association with a memory dump instance identifier identifying a particular memory dump instance, the method further comprising:
processing a request to access the memory contents for the particular memory dump instance;
retrieving the encrypted memory contents and the encrypted symmetric key from the at least one cloud storage medium;
decrypting the encrypted symmetric key using a private key corresponding to the digital certificate; and
facilitating decryption of the encrypted memory contents using the symmetric key.

10. The method as recited in claim 8, the memory being a main memory of the server system.

11. The method as recited in claim 8, further comprising:
obtaining the public key corresponding to the digital certificate from a key management service.

12. The method as recited in claim 8, the symmetric key comprising an Advanced Encryption Standard (AES) key.

13. The method as recited in claim 8, the public key comprising a Rivest-Shamir-Adleman (RSA) key, and wherein encrypting the symmetric key is performed using RSA encryption.

14. The method as recited in claim 8, the memory contents comprising a memory heap.

15. A non-transitory computer-readable medium storing computer-readable program code capable of being executed by one or more processors, the program code comprising computer-readable instructions configurable to cause:
detecting, by a server system, an instance of a memory dump trigger condition;
generating, by the server system, a symmetric key corresponding to the instance of the memory dump trigger condition;
encrypting, by the server system, memory contents residing in memory of the server system using the symmetric key;
encrypting, by the server system, the symmetric key using a public key corresponding to a digital certificate;

determining, by the server system, that the encrypted memory contents are to be stored in association with the encrypted symmetric key in at least one cloud storage medium external to the server system; and transmitting, by the server system, the encrypted memory contents and the encrypted symmetric key to the at least one cloud storage medium for cloud storage of the encrypted memory contents in association with the encrypted symmetric key in the at least one cloud storage medium, the encrypted memory contents being accessible from the at least one cloud storage medium using the encrypted symmetric key.

16. The non-transitory computer-readable medium as recited in claim 15, the encrypted memory contents and encrypted symmetric key being stored in association with a memory dump instance identifier identifying a particular memory dump instance, the program code comprising instructions further configured to cause:

processing a request to access the memory contents for the particular memory dump instance;

retrieving the encrypted memory contents and the encrypted symmetric key from the at least one cloud storage medium;

decrypting the encrypted symmetric key using a private key corresponding to the digital certificate; and facilitating decryption of the encrypted memory contents using the symmetric key.

17. The non-transitory computer-readable medium as recited in claim 15, the memory being a main memory of the server system.

18. The non-transitory computer-readable medium as recited in claim 15, the program code comprising instructions further configured to cause:

obtaining the public key corresponding to the digital certificate from a key management service.

19. The non-transitory computer-readable medium as recited in claim 15, the symmetric key comprising an Advanced Encryption Standard (AES) key.

20. The non-transitory computer-readable medium as recited in claim 15, the public key comprising a Rivest-Shamir-Adleman (RSA) key, and wherein encrypting the symmetric key is performed using RSA encryption.

* * * * *